United States Patent
Maitre et al.

(10) Patent No.: US 11,397,285 B2
(45) Date of Patent: Jul. 26, 2022

(54) OPTICAL ARTICLE HAVING AN ABRASION AND TEMPERATURE RESISTANT INTERFERENTIAL COATING WITH AN OPTIMIZED THICKNESS RATIO OF LOW AND HIGH REFRACTIVE INDEX LAYERS

(71) Applicant: Essilor International, Charenton-le-Pont (FR)

(72) Inventors: Nicolas Maitre, Conflans-Sainte-Honorine (FR); Alexis Theoden, Paris (FR); Francisco De Ayguavives, Les Lilas (FR)

(73) Assignee: Essilor International, Charenton-le-Pont (FR)

( * ) Notice: Subject to any disclaimer, the term of this patent is extended or adjusted under 35 U.S.C. 154(b) by 354 days.

(21) Appl. No.: 16/606,075

(22) PCT Filed: Apr. 18, 2018

(86) PCT No.: PCT/EP2018/059953
§ 371 (c)(1),
(2) Date: Oct. 17, 2019

(87) PCT Pub. No.: WO2018/192998
PCT Pub. Date: Oct. 25, 2018

(65) Prior Publication Data
US 2020/0150314 A1     May 14, 2020

(30) Foreign Application Priority Data
Apr. 18, 2017   (EP) ..................... 17305451

(51) Int. Cl.
*G02B 1/10*   (2015.01)
*G02B 1/116*  (2015.01)
*G02C 7/02*   (2006.01)

(52) U.S. Cl.
CPC .............. *G02B 1/116* (2013.01); *G02C 7/022* (2013.01)

(58) Field of Classification Search
CPC ........... G02C 7/022; G02B 1/11; G02B 1/111; G02B 1/113; G02B 1/115; G02B 1/116
USPC ....................................................... 359/577
See application file for complete search history.

(56) References Cited

U.S. PATENT DOCUMENTS

| | | | |
|---|---|---|---|
| 5,181,141 A | 1/1993 | Sato et al. | |
| 5,268,781 A | 12/1993 | Shigeta et al. | |
| 7,692,855 B2 | 4/2010 | Arrouy et al. | |
| 8,982,466 B2 | 3/2015 | Neuffer | |
| 2006/0017011 A1 | 1/2006 | Shang | |
| 2008/0002260 A1* | 1/2008 | Arrouy | G02B 1/115 359/359 |
| 2008/0213473 A1 | 9/2008 | Roisin et al. | |
| 2014/0125945 A1* | 5/2014 | West | B29D 11/00865 351/159.57 |
| 2015/0234208 A1 | 8/2015 | De Ayguavives et al. | |
| 2017/0075040 A1 | 3/2017 | Bolshakov et al. | |

FOREIGN PATENT DOCUMENTS

| | | |
|---|---|---|
| EP | 2775341 | 9/2014 |
| JP | 2002-122820 | 4/2002 |
| JP | 2003-195003 | 7/2003 |
| JP | 2003-294906 | 10/2003 |
| WO | WO 2008/000841 | 1/2008 |
| WO | WO 2012/076714 | 6/2012 |
| WO | WO 2013/013929 | 1/2013 |
| WO | WO 2015/000534 | 1/2015 |
| WO | WO 2016/102857 | 6/2016 |

OTHER PUBLICATIONS

International Search Report and Written Opinion issued in International Patent Application No. PCT/EP2018/059953, dated Apr. 18, 2018.

* cited by examiner

*Primary Examiner* — William R Alexander
(74) *Attorney, Agent, or Firm* — Norton Rose Fulbright US LLP

(57) ABSTRACT

The invention relates to an optical article comprising a substrate having at least one main face successively coated with a monolayer sub-layer having a thickness higher than or equal to 100 nm, a multilayer interferential coating comprising a stack of at least one high refractive index layer having a refractive index higher than 1.55 and at least one low refractive index layer having a refractive index of 1.55 or less, wherein the ratio is higher than or equal to 2, the outermost high refractive index layer(s) of the interferential coating do(es) not comprise $TiO_2$, and the outermost low refractive index layer(s) of the interferential coating is (are) deposited without ionic assistance.

$$R_D = \frac{\text{thickness of the outermost low refractive index layer(s) of the interferential coating}}{\text{thickness of the outermost high refractive index layer(s) of the interferential coating}}$$

19 Claims, No Drawings

OPTICAL ARTICLE HAVING AN ABRASION AND TEMPERATURE RESISTANT INTERFERENTIAL COATING WITH AN OPTIMIZED THICKNESS RATIO OF LOW AND HIGH REFRACTIVE INDEX LAYERS

The invention relates to an optical article comprising a substrate coated with a multilayer transparent interferential coating, typically an anti-reflection coating, having an improved abrasion resistance and good thermal resistance in particular on an ophthalmic lens, and a method of manufacturing such optical article.

It is a common practice in the art to coat at least one main surface of an optical substrate with several coatings for imparting to the finished article additional or improved optical or mechanical properties. These coatings are designated in general as functional coatings.

The various coatings that may be used to impart a plurality of mechanical and/or optical properties may be impact-resistant coating layers, abrasion- and/or scratch-resistant coating layers, anti-reflection and/or reflective coating layers, and/or anti-fouling layers and/or anti-fog layers.

Different ways to improve the abrasion resistance or the thermal resistance of an optical article can be found in the literature. For instance, it has been proposed to increase the total thickness of the anti-reflection coating, such as in JP 2003-195003 and JP 2003-294906, where a lens coated with a primer coating, a hard coat and a 7-layer anti-reflection coating comprising alternated layers of $SiO_2$ and $TiO_2$, the latter being deposited with ion assistance and known to be sensitive to photo-degradation, is described.

U.S. Pat. No. 8,982,466 relates to an optical lens having a hard coat and a multilayer anti-reflection coating in which the high-refractive-index layers, made of $TiO_2$, together have a thickness of less than 40 nm.

EP 2775341 discloses an eyeglass lens having a hard coat layer, a 360-390 nm thick $SiO_2$ sub-layer and a 4-layer interferential coating made of $SiO_2$, $ZrO_2$ and/or $Ta_2O_5$, in which the layers have a specific nanoindentation hardness and compressive stress, and have generally been deposited by ion-assisted vapor deposition. This deposition technique increases compressive stress and as a result may lead to delamination.

JP 2002-122820 describes a hard-coated substrate coated with a $SiO_2$ sub-layer having a physical thickness of 89-178 nm (optical thickness: 0.25-0.5λ at 520 nm) and a 4-layer anti-reflection coating ($ZrO_2/SiO_2/ZrO_2/SiO_2$). According to this document, high critical temperatures can be reached by being able to balance coating thickness and stress between the layers of the various materials. However, the only parameter which was studied was the thickness of the sub-layer. Its thickness should be such that the ratio (sum of the physical thicknesses of the $SiO_2$ layers, including the sub-layer)/(sum of the physical thicknesses of the $ZrO_2$ layers) ranges from 2 to 3. Higher ratios are said to be undesirable because the durability of the anti-reflection coating is decreased.

U.S. Pat. No. 7,692,855 discloses an optical article having anti-reflection properties and high thermal resistance, comprising a substrate having at least one main face coated with a multilayer anti-reflection coating in which the ratio of physical thickness of low refractive index layers/high refractive index layers is generally higher than 2.1.

An objective of the current invention is to provide a transparent optical article comprising an organic or mineral glass substrate bearing an interferential coating, preferably a lens, and more preferably an ophthalmic lens for eyeglasses, having an improved abrasion resistance and preferably a good resistance to heat and temperature variations, i.e., a high critical temperature, which would be an alternative to already known anti-reflection coated optical articles. These properties should be obtained without decreasing the optical and other mechanical performances of said article, such as anti-reflection or reflection performances.

Another aim of this invention is to provide a process of manufacturing the above defined article, which could be easily integrated into the classical manufacturing chain and would avoid heating the substrate.

The inventors have found that these objectives could be achieved by using a sub-layer and selecting a specific ratio of (physical thickness of outermost low refractive index layer(s) of the interferential coating)/(physical thickness of outermost high refractive index layer(s) of the interferential coating). Compared to classical interferential coatings having a low ratio as defined above, inventive interferential coatings have a higher ratio and a higher abrasion resistance, while exhibiting at the same time a high critical temperature.

Thus, the present invention relates to an optical article comprising a substrate having at least one main face successively coated with:
- a monolayer sub-layer having a thickness higher than or equal to 100 nm,
- a multilayer interferential coating comprising a stack of at least one high refractive index layer having a refractive index higher than 1.55 and at least one low refractive index layer having a refractive index of 1.55 or less, wherein:
the ratio $$R_D = \frac{\text{thickness of the outermost low refractive index layer(s) of the interferential coating}}{\text{thickness of the outermost high refractive index layer(s) of the interferential coating}}$$

is higher than or equal to 2, the outermost high refractive index layer(s) of the interferential coating do(es) not comprise $TiO_2$, and the outermost low refractive index layer(s) of the interferential coating is (are) deposited without ionic assistance.

By monolayer sub-layer, it is meant a single layer sub-layer.

Other objects, features and advantages of the present invention will become apparent from the following detailed description.

DETAILED DESCRIPTION OF THE INVENTION

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

When an optical article comprises one or more surface coatings, the phrase "to deposit a coating or layer onto the optical article" means that a coating or layer is deposited onto the outermost coating of the optical article, i.e. the coating which is the closest to the air.

A coating that is "on" a side of a lens is defined as a coating that (a) is positioned over that side, (b) need not be in contact with that side, i.e., one or more intervening coatings may be disposed between that side and the coating in question (although it is preferably in contact with that side) and (c) need not cover that side completely.

The term "coating" is understood to mean any layer, layer stack or film, which may be in contact with the substrate and/or with another coating, for example a sol-gel coating or a coating made of an organic resin. A coating may be deposited or formed through various methods, including wet processing, gaseous processing, and film transfer.

The optical article prepared according to the present invention is a transparent optical article, preferably an optical lens or lens blank, and more preferably an ophthalmic lens or lens blank. The optical article may be coated on its convex main face (front side), concave main face (back/rear side), or both faces with the multilayer interferential coating according to the invention, preferably on the convex (front) main face. As used herein, the rear face of the substrate is intended to mean the face which, when using the article, is the nearest from the wearer's eye. It is generally a concave face. On the contrary, the front face of the substrate is the face which, when using the article, is the most distant from the wearer's eye. It is generally a convex face. The optical article can also be a plano article.

Herein, the term "lens" means an organic or inorganic glass lens, comprising a lens substrate, which may be coated with one or more coatings of various natures.

The term "ophthalmic lens" is used to mean a lens adapted to a spectacle frame, for example to protect the eye and/or correct the sight. Said lens can be chosen from afocal, unifocal, bifocal, trifocal and progressive lenses. Although ophthalmic optics is a preferred field of the invention, it will be understood that this invention can be applied to optical articles of other types, such as, for example, lenses for optical instruments, in photography or astronomy, optical sighting lenses, ocular visors, optics of lighting systems, etc.

In the present description, unless otherwise specified, an optical article/material is understood to be transparent when the observation of an image through said optical article is perceived with no significant loss of contrast, that is, when the formation of an image through said optical article is obtained without adversely affecting the quality of the image. This definition of the term "transparent" can be applied to all objects qualified as such in the description, unless otherwise specified.

A substrate, in the sense of the present invention, should be understood to mean an uncoated substrate, and generally has two main faces. The substrate may in particular be an optically transparent material having the shape of an optical article, for example an ophthalmic lens destined to be mounted in glasses. In this context, the term "substrate" is understood to mean the base constituent material of the optical lens and more particularly of the ophthalmic lens. This material acts as support for a stack of one or more coatings or layers.

The substrate may be made of mineral glass or organic glass, preferably organic glass. The organic glasses can be either thermoplastic materials such as polycarbonates and thermoplastic polyurethanes or thermosetting (cross-linked) materials such as diethylene glycol bis(allylcarbonate) polymers and copolymers (in particular CR-39® from PPG Industries), thermosetting polyurethanes, polythiourethanes, preferably polythiourethane resins having a refractive index of 1.60 or 1.67, polyepoxides, polyepisulfides, such as those having a refractive index of 1.74, poly(meth)acrylates and copolymers based substrates, such as substrates comprising (meth)acrylic polymers and copolymers derived from bisphenol-A, polythio(meth)acrylates, as well as copolymers thereof and blends thereof. Preferred materials for the lens substrate are polycarbonates (PC) and diethylene glycol bis(allylcarbonate) polymers, in particular substrates made of polycarbonate.

Specific examples of substrates suitable to the present invention are those obtained from thermosetting polythiourethane resins, which are marketed by the Mitsui Toatsu Chemicals company as MR series, in particular MR6®, MR7® and MR8® resins. These substrates as well as the monomers used for their preparation are especially described in the patents U.S. Pat. Nos. 4,689,387, 4,775,733, 5,059,673, 5,087,758 and 5,191,055.

Prior to depositing the sub-layer, the interferential coating or other functional coatings, the surface of the article is usually submitted to a physical or chemical surface activating and cleaning pre-treatment, so as to improve the adhesion of the layer to be deposited, such as disclosed in WO 2013/013929.

This pre-treatment is generally carried out under vacuum. It may be a bombardment with energetic species, for example an ion beam method ("Ion Pre-Cleaning" or "IPC") or an electron beam method, a corona treatment, an ion spallation treatment, an ultraviolet treatment or a plasma treatment under vacuum, using typically an oxygen or an argon plasma. It may also be an acid or a base surface treatment and/or a solvent surface treatment (using water or an organic solvent) with or without ultrasonic treatment. Many treatments may be combined. Thanks to these cleaning treatments, the cleanliness of the substrate surface is optimized.

By energetic species, it is meant species with an energy ranging from 1 to 300 eV, preferably from 10 to 150 eV, and more preferably from 10 to 150 eV and most preferably from 40 to 150 eV. Energetic species may be chemical species such as ions, radicals, or species such as photons or electrons.

The interference coating may be virtually any interference coating conventionally used in the field of optics, in particular ophthalmic optics. The interference coating may be, in a non-limiting manner, an anti-reflection coating, a reflective (mirror) coating, an infrared filter or an ultraviolet filter, but is preferably an anti-reflection coating.

An anti-reflection coating is a coating, deposited on the surface of an article, which improves the anti-reflection properties of the final article. It reduces the reflection of light at the article/air interface over a relatively broad portion of the visible spectrum.

The multilayer interferential coating of the invention comprises a stack of at least one high refractive index layer having a refractive index higher than 1.55 and at least one low refractive index layer having a refractive index of 1.55 or less.

More preferably, it comprises at least two layers with a low refractive index (LI) and at least two layers with a high refractive index (HI). The total number of layers in the interferential coating is preferably higher than or equal to 3, more preferably higher than or equal to 4, and preferably lower than or equal to 7, more preferably lower than or equal to 6, even more preferably lower than or equal to 5, and most preferably equal to 5 layers.

As used herein, a layer of the interferential coating is defined as having a thickness higher than or equal to 1 nm. Thus, any layer having a thickness lower than 1 nm will not be considered when counting the number of layers in the interferential coating. The sub-layer and optional impedance layers either are not considered when counting the number of layers of the interferential coating or when indicating its thickness.

HI layers and LI layers do not necessarily alternate with each other in the stack, although they also may, according to one embodiment of the invention. Two HI layers (or more) may be deposited onto each other, as well as two LI layers (or more) may be deposited onto each other.

In the present application, a layer of the interferential coating is said to be a layer with a high refractive index (HI) when its refractive index is higher than 1.55, preferably higher than or equal to 1.6, even more preferably higher than or equal to 1.8 or 1.9 and most preferably higher than or equal to 2. Said HI layers preferably have a refractive index lower than or equal to 2.2 or 2.1. A layer of an interferential coating is said to be a low refractive index layer (LI) when its refractive index is lower than or equal to 1.55, preferably lower than or equal to 1.52, more preferably lower than or equal to 1.48 or 1.47. Said LI layer preferably has a refractive index higher than or equal to 1.1.

The HI layer generally comprises one or more metal oxides such as, without limitation, zirconia ($ZrO_2$), titanium dioxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), $La_2O_3$, $Nb_2O_5$, $Y_2O_3$, with the proviso that $TiO_2$ is not present in the outermost high refractive index layer(s) of the interferential coating. In some aspects of the invention, the outermost high refractive index layer(s) of the interferential coating do(es) not comprise titanium oxide. In a preferred embodiment, the interferential coating does not comprise any layer comprising $TiO_2$, or more generally, titanium oxide. As used herein, titanium oxide is intended to mean titanium dioxide or a substoichiometric titanium oxide (TiOx, where x<2). Titanium oxide-containing layers are indeed sensitive to photo-degradation.

Optionally, the HI layers may further contain silica or other materials with a low refractive index, provided they have a refractive index higher than 1.55 as indicated here-above. The preferred materials include $ZrO_2$, $PrTiO_3$, $Nb_2O_5$, $Ta_2O_5$, $Y_2O_3$ and mixtures thereof.

The LI layer is also well known and may comprise, without limitation, $SiO_2$, $MgF_2$, or a mixture of silica and alumina, especially silica doped with alumina, the latter contributing to increase the interferential coating thermal resistance. The LI layer is preferably a layer comprising at least 80% by weight of silica, more preferably at least 90% by weight of silica, relative to the layer total weight, and even more preferably consists in a silica layer.

Optionally, the LI layers may further contain materials with a high refractive index, provided the refractive index of the resulting layer is lower than or equal to 1.55.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2+Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

The interferential coating external layer, i.e., its layer that is the furthest from the substrate is generally a silica-based layer, comprising preferably at least 80% by weight of silica, more preferably at least 90% by weight of silica (for example a silica layer doped with alumina), relative to the layer total weight, and even more preferably consists of a silica layer.

Generally, the HI and LI layers have a physical thickness ranging from 10 to 120 nm, preferably from 20 to 110 nm.

Generally, the total thickness of the interferential coating plus the thickness of the sub-layer plus the thickness of the impedance layers (defined later in this application) if present is lower than 1 micrometer, preferably lower than or equal to 800 nm, more preferably lower than or equal to 500 nm and even more preferably lower than or equal to 450 nm. The interferential coating total thickness is generally higher than 100 nm, preferably higher than 200 nm.

The $R_D$ ratio of the present interferential coating is higher than or equal to 2, and preferably higher than or equal to any one of the following values: 2.05, 2.1, 2.15, 2.2, 2.25, 2.3, 2.35, 2.4, 2.5, 2.6, 2.7, 2.75, and 2.8. $R_D$ is defined as:

$$R_D = \frac{\text{thickness of the outermost low refractive index layer(s) of the interferential coating}}{\text{thickness of the outermost high refractive index layer(s) of the interferential coating}}$$

By outermost high or low refractive index layer(s) of the interferential coating, it is meant the layer(s) of the interferential coating that is (are) the furthest from the substrate. Generally, there is only one outermost high (or low) refractive index layer in the interferential coating, i.e., when high refractive index layers and low refractive index layers alternate with each other in the stack. However, in some embodiments, there can be two or more adjacent high (or low) refractive index layers in outermost position in the interferential coating. In this case, it is considered that there is a plurality of outermost high (or low) refractive index layers in the interferential coating, and this is taken into account by adding their respective thicknesses for the calculation of the $R_D$ ratio.

When a high refractive index layer of the interferential coating is an electrically conductive layer, especially a conductive oxide layer (such as an ITO, $SnO_2$ layer) and is positioned as the outermost high refractive index layer but is not adjacent to one or more non conductive high refractive index layers (such as a $ZrO_2$, $Ta_2O_5$ layer), such high refractive index conductive layer is not taken into account for the calculation of $R_D$ and is not considered as being part of the interferential coating.

As an example, for an interferential coating comprising the following layers: Air/hydrophobic coating/SiO$_2$ (thickness a)/ITO (thickness b)/SiO$_2$ (thickness c)/ZrO$_2$ (thickness d)/SiO$_2$ ... , $$R_D = (a+c)/d$$

The thicknesses of the two SiO$_2$ layers are added, as the conductive layer is not considered as being part of the coating. Consequently, the above defined general rules for the calculation are applied.

However, if the conductive layer identified as the outermost high refractive index layer is adjacent to one or more non conductive high refractive index layer(s) (plurality of adjacent high refractive index layers), the thicknesses of those plurality of high refractive index layers are added for the calculation of the $R_D$ ratio.

As an example, for an interferential coating comprising the following layers Air/hydrophobic coating/SiO$_2$(thickness a')/ITO(thickness b')/ZrO$_2$(thickness c')/SiO$_2$ ... .

$$R_D = a'/(b'+c')$$

It is to be noted that such high refractive index conductive layer (such as ITO or SnO$_2$) is generally thin or very thin (typically less than one of the following values: 20 nm thickness, 15 nm thickness, 10 nm thickness).

In the present invention, the interferential coating is designed with a ratio $R_D$ as high as possible so as to increase the resistance to abrasion of the optical article. Indeed, a relationship has been established between abrasion resistance and the ratio $R_D$ mentioned above. The inventors have found that limiting the thickness of the outermost layer(s) of high refractive index materials and/or increasing the thickness of the outermost layer(s) of low refractive index materials was beneficial to the abrasion resistance of the optical article. A standard Bayer abrasion test can be used to determine the abrasion resistance of the optical article.

Moreover, the critical temperature of an article coated according to the invention is preferably ≥80° C., more preferably ≥90° C., even better ≥100° C. and best ≥115° C.

A high ratio $R_D$ generally also favors a high critical temperature. Another hypothesis that could be formulated, without the applicant being tied to it, is that the structure of optical stacks, in particular the physical thickness ratio of each material, has an influence on the stress condition of the stack. The higher the compressive stress (LI layers are under compression), the better the critical temperature performance. However, if the compressive stress is increased beyond a certain limit, delamination may occur in the interferential coating.

It is also possible to define:

R1=thickness of the outermost internal low refractive
index layer(s) of the interferential coating/thickness of the outermost internal high refractive
index layer(s) of the interferential coating By outermost internal high or low refractive index layer(s) of the interferential coating, it is meant the layer(s) of the interferential coating that is (are) the furthest from the substrate but positioned just before the outermost low and high refractive index layer(s) of the interferential coating as defined previously. Generally, there is only one internal outermost high (or low) refractive index layer in the interferential coating, i.e., when high refractive index layers and low refractive index layers alternate with each other in the stack. However, in some embodiments, there can be two or more adjacent high (or low) refractive index layers in internal outermost position in the interferential coating. In this case, it is considered that there is a plurality of outermost high (or low) refractive index layers in the interferential coating, and this is taken into account by adding their respective thicknesses for the calculation of the R1 ratio.

When a high refractive index layer of the interferential coating is an electrically conductive layer, especially a conductive oxide layer (such as an ITO, SnO$_2$ layer) and is positioned as the outermost internal high refractive index layer but is not adjacent to one or more non conductive high refractive index layers (such as a ZrO$_2$, Ta$_2$O$_5$ layer), such conductive layer is not taken into account for the calculation of R1 and is not considered as being part of the interferential coating.

As an example, for an interferential coating comprising the following layers: Air/hydrophobic coating/ ... /SiO$_2$ (thickness a")/ITO (thickness b")/SiO$_2$ (thickness c")/ZrO$_2$ (thickness d")/SiO$_2$ ... , $$R1 = (a''+c'')/d''$$

The thicknesses of the two internal SiO$_2$ layers are added, as the conductive layer is not considered as being part of the coating. Consequently, the above defined rules for the calculation are applied.

However, if the high refractive index conductive layer identified as the outermost internal layer is adjacent to one or more non conductive high refractive index layer (plurality of adjacent high refractive index layers), the thicknesses of those plurality of layers are added for the calculation of the R1 ratio.

As an example, for an interferential coating comprising the following layers Air/ ... /SiO$_2$(thickness a''')/ITO (thickness b''')/ZrO$_2$(thickness c'''/SiO$_2$) ...

$$R1 = a'''/(b'''+c''')$$

It is to be noted that such high refractive index conductive layer (such as ITO or SnO$_2$) is generally thin or very thin (typically less than one of the following values: 20 nm thickness, 15 nm thickness, 10 nm thickness).

In an embodiment R1 is preferably higher than or equal to 2.5, preferably higher than or equal to 2.6. In an embodiment, R1 is lower than 3.5, preferably lower than at least one of the following values 3.4, 3.3, 3.2, 3.1, 3. Those values provide a good compromise of properties. In another embodiment, R1 ranges from 2 to 3.

In the present invention, the multilayer interferential coating is deposited onto a monolayer sub-layer having a thickness higher than or equal to 100 nm. It should be noted that such sub-layer does not belong to the interferential coating. Said sub-layer in preferably in direct contact with the interferential coating.

As used herein, an interferential coating sub-layer or adhesion layer is intended to mean a relatively thick coating, used in order to improve mechanical properties such as abrasion resistance and/or scratch resistance of the interferential coating and/or so as to reinforce its adhesion to the substrate or to the underlying coating.

Because of its relatively high thickness, the sub-layer does not generally interact a lot with the optical activity of the interferential coating, such as reflective or anti-reflective properties, especially when it has a refractive index close to that of the underlying coating (which is generally the anti-abrasion and/or anti-scratch coating) or to that of the substrate, if the sub-layer is directly deposited onto the substrate.

The sub-layer has a thickness that is generally lower than one of the following values: 500 nm, 400 nm, 300 nm and is preferably lower than 200 nm, and is generally higher than or equal to 110 nm, more preferably higher than or equal to 120, 130 or 150 nm.

Even better, the sub-layer has a thickness lower than or equal to 355 nm.

The sub-layer preferably is a $SiO_2$-based layer, this layer comprising preferably at least 80% by weight of silica, more preferably at least 90% by weight of silica, relative to the layer total weight, and even more preferably consists of a silica layer. In another embodiment, this $SiO_2$-based layer is a silica layer doped with alumina, in amounts such as defined hereabove, preferably consists of a silica layer doped with alumina.

In some embodiments of the invention, especially when the sub-layer and the underlying coating (or the substrate, if there is no functional coating between the substrate and the sub-layer) have substantially different refractive indexes, one or more so-called "impedance layers" can be interleaved between the underlying coating (or the substrate) and the sub-layer, thus forming an impedance coating that limits interference fringes due to differences of refractive indices between the sub-layer and the underlying coating or substrate. This embodiment is preferred when the underlying coating, which is generally an anti-abrasion and/or anti-scratch coating, or the substrate, has a high refractive index, i.e., a refractive index higher than 1.55, preferably higher than or equal to 1.57.

In this case, the optical article may comprise preferably at most three additional layers, more preferably at most two additional layers, interleaved between the optionally coated substrate and the sub-layer. These additional/intermediate layers are preferably thin layers, the function of which is to limit the reflections at the sub-layer/underlying coating interface or sub-layer/substrate interface, as the case may be, by interferential effect . . . .

In one embodiment, the impedance coating comprises, preferably consists of a layer with a high refractive index and with a thickness lower than or equal to 80 nm, more preferably lower than or equal to 50 nm and most preferably lower than or equal to 30 or 20 nm. Such layer with a high refractive index is preferably in direct contact with the substrate with a high refractive index or the underlying coating with a high refractive index, as appropriate. Of course, this embodiment may be used even if the substrate (or the underlying coating) has a refractive index lower than or equal to 1.55.

As an alternative, the impedance coating comprises, in addition to the previously mentioned layer with a high refractive index, a $SiO_2$-based layer made of a material (that is to say comprising preferably at least 80% by weight of silica) with a refractive index lower than or equal to 1.55, preferably lower than or equal to 1.52, more preferably lower than or equal to 1.50, and with a thickness lower than or equal to 80 nm, more preferably lower than or equal to 50 nm and even more preferably lower than or equal to 45 nm, onto which said layer with a high refractive index is deposited. Typically, in this instance, the impedance coating comprises, deposited in this order onto the optionally coated substrate, a 4-50 nm-thick $SiO_2$ layer, and a 4-15 nm-thick $ZrO_2$ or $Ta_2O_5$ layer, which is in contact with the sub-layer.

Optionally, the exposed surface of the sub-layer may be submitted, prior to depositing the first layer of the interferential coating, to a physical or a chemical activation treatment which may be selected from the pre-treatments the substrate may undergo prior to depositing the sub-layer and which have already be mentioned hereabove. The preferred pre-treatment is an ion bombardment, for example by using an ion gun-generated argon ion beam. Such physical or chemical activation treatments may also be performed on the surface of one or more layer(s) of the multilayer interference coating.

The optical article of the invention may be made antistatic, that is to say not to retain and/or develop a substantial static charge, by incorporating at least one electrically conductive layer into the stack present on the surface of the article, preferably in the interferential coating.

The ability for a lens to evacuate a static charge obtained after rubbing with a piece of cloth or using any other procedure to generate a static charge (charge applied by corona . . . ) may be quantified by measuring the time it takes for said charge to dissipate. Thus, antistatic lenses have a discharge time of about a few hundred milliseconds, preferably 500 ms or less, whereas it is of about several tens of seconds for a static lens. In the present application, discharge times are measured according to the method exposed in the French application FR 2943798.

As used herein, an "electrically conductive layer" or an "antistatic layer" is intended to mean a layer which, due to its presence on the surface of a non-antistatic substrate (i.e. having a discharge time higher than 500 ms), enables the lens not to retain and/or develop a substantial static charge, for example to have a discharge time of 500 ms or less after a static charge has been applied onto the surface thereof, so that small dust is prevented from adhering to the lens due to prevention of static effects.

The electrically conductive layer may be located at various places in the stack, generally in or in contact with the interferential coating, provided that the reflective or anti-reflective properties thereof are not affected. It is preferably located between two layers of the interferential coating, and/or is preferably adjacent to a layer with a high refractive index of such interferential coating. In an embodiment, the electrically conductive layer is located immediately under a layer with a low refractive index of the interferential coating, most preferably is the penultimate layer of the interferential coating by being located immediately under the LI external layer of the interferential coating.

The electrically conductive layer should be thin enough not to alter the transparency of the interferential coating. The electrically conductive layer is preferably made from an electrically conductive and highly transparent material, generally an optionally doped metal oxide. In this case, the thickness thereof preferably ranges from 1 to 15 nm, more preferably from 1 to 10 nm, ideally from 2 to 8 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer or a tin oxide layer.

Generally, the electrically conductive layer contributes, within the stack, but in a limited manner because of its low thickness, to obtaining interferential properties and typically represents a layer with a high refractive index in said coating. This is the case for those layers made from an electrically conductive and highly transparent material such as ITO or $SnO_2$ layers. Accordingly, when it is present, the electrically conductive layer is preferably the outermost high refractive index layer of the interferential coating, or one of the outermost high refractive index layers of the interferential coating when it is adjacent to one or more high refractive index layers.

The electrically conductive layer may be deposited according to any suitable method, for example by vacuum evaporation deposition, preferably ion-beam-assisted (IAD, described below) to increase its transparence, or by means of cathode sputtering.

The electrically conductive layer may also be a very thin layer of a noble metal (Ag, Au, Pt, etc.) typically smaller than 1 nm in thickness and preferably less than 0.5 nm in thickness.

The various layers of the interferential coating, the sub-layer and the optional impedance layers are preferably deposited by vapor phase deposition, under vacuum, according to any of the following methods: i) by evaporation, optionally under ion beam assistance; ii) by ion-beam spraying; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is evaporation under vacuum. Preferably, the deposition of each of the above-mentioned layers is conducted by evaporation under vacuum. Such a process does advantageously avoid heating the substrate, which is particularly interesting for coating heat-sensitive substrates such as organic glasses.

A treatment step with energetic species such as previously defined may also be carried out, simultaneously whilst depositing one or more of the various layers of the interference coating, sub-layer or optional impedance layers. In particular, working under ion assistance enables to pack said layers while they are being formed, and increases their compression and refractive index.

The ion assisted deposition method or IAD is notably described in US patent application 2006/017011 and in U.S. Pat. No. 5,268,781. Vapor phase deposition under ion assistance comprises, depositing onto a substrate, a film of material by simultaneously bombarding the surface of the substrate with an ion beam. The ion bombardment leads to an atomic rearrangement in the coating being formed, which increases its density. The IAD not only allows an improvement of the deposited layer adhesion, but also an increase in their refractive index. The IAD operation may be performed by means of an ion gun, where ions are particles composed of gas atoms from which one or more electron(s) is or are extracted. It does preferably consist of bombarding the surface to be treated with oxygen ions. Other ionized gases may be used, either combined with oxygen, or not, for example argon, nitrogen, in particular a mixture of $O_2$ and argon according to a volume ratio ranging from 2:1 to 1:2.

The outermost low refractive index layer(s) of the interferential coating is (are) deposited without ionic assistance, preferably without concomitant treatment with energetic species. In another embodiment, the low refractive index layers of the interferential coating and/or the sub-layer are deposited without ionic assistance, preferably without concomitant treatment with energetic species. In another embodiment, the outermost high refractive index layer(s) of the interferential coating is (are) deposited without ionic assistance (preferably without concomitant treatment with energetic species), except the electrically conductive layer(s), if present in the outermost position. In a further embodiment, no layer of the interferential coating is deposited under ion assistance (preferably no layer of the interferential coating is deposited under concomitant treatment with energetic species), except the electrically conductive layers, if present in the interferential coating.

Optionally, the deposition of one or more of the said layers is performed by supplying (a supplementary) gas during the deposition step of the layer in a vacuum chamber, such as disclosed in US 20080213473. Concretely, a gas such as a rare gas, for example argon, krypton, xenon, neon; a gas such as oxygen, nitrogen, or mixtures of two gases or more amongst these, is or are introduced into the vacuum deposition chamber while the layer is being deposited. The gas employed during this step is not an ionized gas, more preferably not an activated gas.

This gas supply makes it possible to regulate the pressure and differs from an ionic bombardment treatment, such as ion assistance. It generally enables the limitation of stress in the interferential coating and to reinforce the adhesion of the layers. When such deposition method is used, which is called deposition under gas pressure regulation, it is preferred to work under an oxygen atmosphere (so called "passive oxygen").

In an embodiment of the invention, the deposition of the sub-layer is performed in a vacuum chamber in which at least one supplementary gas is supplied during said deposition. In another embodiment, the outermost high refractive index layer(s) of the interferential coating, except the electrically conductive layers, if present in outermost position, is (are) deposited in a vacuum chamber in which at least one supplementary gas is supplied during said deposition.

According to a particularly preferred embodiment, the optical article comprises, starting from the surface of the substrate optionally coated with one or more functional coatings such as a hard coat, preferably a low refractive index coating having a thickness ranging from 4 to 50 nm, preferably from 30 to 50 nm, preferably of silica, preferably a high refractive index impedance coating having a thickness ranging from 3 to 12 nm, more preferably from 5 to 12 nm, preferably of zirconia, a sub-layer having a thickness of from 100 to 300 nm, more preferably from 100 to 200 nm, even more preferably from 100 to 170 nm, preferably of silica-based sub-layer, and an interferential coating, preferably an anti-reflective coating, containing in the following order, a high refractive index with a thickness of from 8 to 35 nm, preferably of from 10 to 30 nm, preferably of zirconia, a layer with a low refractive index with a thickness of from 30 to 50 nm, preferably of from 38 to 48 nm, preferably of silica, a layer with a high refractive index with a thickness of from 25 to 50 nm, preferably of from 38 to 48 nm, preferably of zirconia, optionally an electrically conductive layer with a thickness of from 3 to 15 nm, preferably of from 4 to 8 nm, preferably made of tin oxide, and a layer with a low refractive index with a thickness of from 80 to 120 nm, preferably of from 90 to 110 nm, preferably of silica.

The interferential coating may be deposited directly onto a bare substrate. In some applications, it is preferred that the main surface of the substrate be coated with one or more functional coatings improving its optical and/or mechanical properties, prior to depositing the interferential coating of the invention. These functional coatings traditionally used in optics may be, without limitation, an impact-resistant primer layer, an abrasion- and/or scratch-resistant coating (hard coat), a polarized coating, an antistatic coating, a photochromic coating, a tinted coating or a stack made of two or more of such coatings.

The impact-resistant primer coating which may be used in the present invention can be any coating typically used for improving impact resistance of a finished optical article. By definition, an impact-resistant primer coating is a coating which improves the impact resistance of the finished optical article as compared with the same optical article but without the impact-resistant primer coating.

Typical impact-resistant primer coatings are (meth)acrylic based coatings and polyurethane based coatings. In particular, the impact-resistant primer coating according to the invention can be made from a latex composition such as a poly(meth)acrylic latex, a polyurethane latex or a polyester latex.

Preferred primer compositions include compositions based on thermoplastic polyurethanes, such as those described in the patents JP 63-141001 and JP 63-87223, poly(meth)acrylic primer compositions, such as those described in the patents U.S. Pat. Nos. 5,015,523 and 6,503,631, compositions based on thermosetting polyurethanes, such as those described in the patent EP 0404111 and compositions based on poly(meth)acrylic latexes or polyurethane latexes, such as those described in the patents U.S. Pat. No. 5,316,791 and EP 0680492. Preferred primer compositions are compositions based on polyurethanes and compositions based on latexes, in particular polyurethane latexes, poly(meth)acrylic latexes and polyester latexes, as well as their combinations. In one embodiment, the impact-resistant primer comprises colloidal fillers.

Poly(meth)acrylic latexes are latexes based on copolymers essentially made of a (meth)acrylate, such as for example ethyl (meth)acrylate, butyl (meth)acrylate, methoxyethyl (meth)acrylate or ethoxyethyl (meth)acrylate, with at least one other co-monomer in a typically lower amount, such as for example styrene.

Commercially available primer compositions suitable for use in the invention include the Witcobond® 232, Witcobond® 234, Witcobond® 240, Witcobond® 242 compositions (marketed by BAXENDEN CHEMICALS), Neorez® R-962, Neorez® R-972, Neorez® R-986 and Neorez® R-9603 (marketed by ZENECA RESINS), and Neocryl® A-639 (marketed by DSM coating resins).

The thickness of the impact-resistant primer coating, after curing, typically ranges from 0.05 to 30 µm, preferably 0.2 to 20 µm and more particularly from 0.5 to 10 µm, and even better 0.6 to 5 µm or 0.6 to 3 µm, and most preferably 0.8 to 1.5 microns.

The impact-resistant primer coating is preferably in direct contact with an abrasion- and/or scratch-resistant coating.

The abrasion- and/or scratch-resistant coating may be any layer traditionally used as an anti-abrasion and/or anti-scratch coating in the field of optical lenses.

The abrasion- and/or scratch-resistant coatings are preferably hard coatings based on poly(meth)acrylates or silanes, generally comprising one or more mineral fillers intended to increase the hardness and/or the refractive index of the coating once cured.

Abrasion- and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings that are recommended for the present invention include coatings based on epoxysilane hydrolyzates such as those described in the patents EP 0614957, U.S. Pat. Nos. 4,211,823 and 5,015,523.

A preferred abrasion- and/or scratch-resistant coating composition is the one disclosed in the patent EP 0614957, in the name of the applicant. It comprises a hydrolyzate of epoxy trialkoxysilane and dialkyl dialkoxysilane, colloidal silica and a catalytic amount of an aluminum-based curing catalyst such as aluminum acetylacetonate, the rest being essentially composed of solvents traditionally used for formulating such compositions. Preferably, the hydrolyzate used is a hydrolyzate of γ-glycidoxypropyltrimethoxysilane (GLYMO) and dimethyldiethoxysilane (DMDES).

The abrasion- and/or scratch-resistant coating composition may be deposited by known methods and is then cured, preferably using heat or ultraviolet radiation. The thickness of the (cured) abrasion- and/or scratch-resistant coating does generally vary from 2 to 10 µm, preferably from 3 to 5 µm.

The optical article according to the invention may also comprise coatings formed on the interferential coating and capable of modifying the surface properties thereof, such as a hydrophobic and/or oleophobic coating (antifouling top coat). These coatings are preferably deposited onto the outer layer of the interferential coating. Generally, their thickness is lower than or equal to 10 nm, does preferably range from 1 to 10 nm, more preferably from 1 to 5 nm. Antifouling top coats are generally coatings of the fluorosilane or fluorosilazane type, preferably comprising fluoropolyether moieties and more preferably perfluoropolyether moieties. More detailed information on these coatings is disclosed in WO 2012076714.

Instead of a hydrophobic coating, a hydrophilic coating may be used which provides anti-fog properties (anti-fog coating), or a precursor of an anti-fog coating which provides anti-fog properties when associated with a surfactant. Examples of such anti-fog precursor coatings are described in the patent application WO 2011/080472.

The additional coatings such as primers, hard coats and antifouling top coats may be deposited onto the main face of the substrate using methods known in the art, including spin-coating, dip-coating, spray-coating, evaporation, sputtering, chemical vapor deposition and lamination.

Typically, an optical article according to the invention comprises a substrate that is successively coated with an impact-resistant primer layer, an anti-abrasion and/or scratch-resistant layer, a sub-layer, an interferential coating according to the invention, and a hydrophobic and/or oleophobic coating, or with a hydrophilic coating which provides anti-fog properties, or an anti-fog precursor coating.

Due to the presence of the interferential coating according to the invention (as an example an antireflective coating), the optical articles of the invention exhibit high value of abrasion resistance measured according to the Bayer ISTM operating protocol described hereafter.

In an embodiment, the optical article, more preferably an ophthalmic lens whose main face, preferably the front face, is covered by the interferential coating of the invention exhibits a Bayer value measured by the protocol described in the experimental part ranging from 15 to 21.5, more preferably from 16 to 21.5.

In an embodiment, the optical article is an ophthalmic lens comprising a substrate having at least one main face successively coated with:
  a monolayer sub-layer having a thickness higher than or equal to 100 nm,
  a multilayer interferential coating, preferably an antireflective coating, comprising a stack of at least one high refractive index layer having a refractive index higher than 1.55 and at least one low refractive index layer having a refractive index of 1.55 or less, wherein: the ratio:

$$R_D = \frac{\text{thickness of the outermost low refractive index layer(s) of the interferential coating}}{\text{thickness of the outermost high refractive index layer(s) of the interferential coating}}$$

is higher than or equal to 2, the outermost high refractive index layer(s) of the interferential coating do(es) not comprise $TiO_2$; the outermost low refractive index layer(s) of the interferential coating is (are) deposited without ionic assistance and the interferential coating is applied on the front main face of the ophthalmic lens.

In a preferred embodiment, the front main face of the ophthalmic lens according to the invention as defined before exhibits a Bayer value V1 and the back main face of said lens is coated by an interferential coating, preferably an antireflective coating, different from that of the front main face and that exhibits a Bayer value V2, V1 and V2 satisfying the following relationship:

V1-V2 is higher than 0.5, preferably higher than 1, more preferably higher than 1.5, even better higher than at least one of the following values: 2; 2.5; 3; 3.5; 4, and V1 is preferably higher than or equal to 16, more preferably ranges from 16 to 21.5.

The Bayer values being measured only on a convex surface, the interferential coating on the back main face has to be reproduced on a convex surface on a separate lens, and its Bayer value measured according to the same protocol as the front face in order to obtain the V2 value.

In another embodiment, V1-V2 is higher than 0.5, preferably higher than 1, more preferably higher than 1.5, even better higher than at least one of the following values: 2; 2.5; 3; 3.5; 4, and the front main face exhibits a Ruv value at an angle of incidence of 15° higher than 5% and the back main face exhibits a Ruv value at an angle of incidence of 35° lower than 5%, preferably lower than or equal to 4.5%, more preferably lower than or equal to 4% and even better lower than or equal to 3.5%, with the proviso that the reflection on the front main face at an angle of incidence of 15°, noted R(15°), and/or Rm(15°) (defined hereunder) and/or the average reflectance of the front main face coated with the interferential coating of the invention, between 350 nm and a wavelength comprised between 380 nm and 400 nm, preferably between 350 nm and 380 nm, weighted by the function W($\lambda$), do(es) not exceed the values defined later in this application.

Ruv is the mean reflection factor of a face of an optical article between 280 nm and 380 nm, weighted by the function W($\lambda$) defined in the ISO 13666:1998 standard, measured in the present application at an angle of incidence of 35° for the back main face and at an angle of incidence of 15° for the front main face. Definition of W($\lambda$) and calculation examples for angles of incidence at 30° and 45° are specified in WO2012076714. The man skilled in the art can easily implement calculation based on reflection values measured on the respective faces at the wished incidence angle (15°, 35°).

In one embodiment, the optical article according to the invention does not absorb in the visible or not much, which means, in the context of the present application, that its relative light transmission factor in the visible spectrum Tv is higher than or equal to any one of the following values: 87%, 88%, 89%, 90%, 92%, 95%, 96%, 97%, 98%. Said Tv factor preferably ranges from 87% to 98.5%, more preferably from 87% to 97%, even better from 87% to 96%. In another embodiment, Tv ranges from 89% to 98%, preferably from 90% to 98%, better 95% to 97%.

The Tv factor, also called "luminous transmission" of the system, is such as defined in ISO standard 13666:1998 and is measured accordingly to standard ISO 8980-3. It is defined as the average in the 380-780 nm wavelength range that is weighted according to the sensitivity of the eye at each wavelength of the range and measured under D65 illumination conditions (daylight).

The "mean light reflection factor," noted $R_v$, is such as defined in the ISO 13666:1998 Standard, and measured in accordance with the ISO 8980-4 Standard (for an angle of incidence lower than 17°, typically of 15°), i.e. this is the weighted spectral reflection average over the whole visible spectrum between 380 and 780 nm.

The mean light reflection factor $R_v$ of the face of the lens coated by an anti-reflection coating according to the invention is preferably lower than 2.5% (per face), preferably lower than 2%, more preferably lower than 1%, even more preferably ≤0.75%, and even more preferably ≤0.5%, per face of the article.

According to an embodiment of the invention, the reflection R(15°) (measured at an incidence angle of 15°) of the main face of the optical article coated according to the invention is lower than 50% for at least one wavelength in the wavelength range 300-350 nm.

According to another embodiment of the invention, the reflection R(15°) of the main face of the optical article coated according to the invention is lower than 50% at the wavelength 320 nm.

According to an embodiment of the invention, the mean reflection coefficient Rm(15°) (non weighted average reflection) in the wavelength range 300-350 nm of the main face of the optical article coated according to the invention is lower than 50%, preferably lower than or equal to 45%.

The average reflectance of the coated front main face of the interferential coating of the invention, between 350 nm and a wavelength comprised between 380 nm and 400 nm, preferably between 350 nm and 380 nm, weighted by the function W($\lambda$), is lower than 35%, preferably lower than or equal to 32%, more preferably lower than or equal to 30% and even better in certain cases lower than or equal to 25% or 20%, for at least one angle of incidence comprised between 0° and 17°.

In each of these embodiments, the total number of layers in the interferential coating, preferably an antireflection coating, is preferably higher than or equal to 3, preferably lower than or equal to 5, and/or the total thickness of the interferential coating (preferably an antireflective coating) plus the thickness of the sublayer plus the thickness of the impedance layer(s) if present is preferably lower than 1 micrometer, more preferably lower than or equal to 800 nm or 500 nm.

The definition of the average reflectance and function W($\lambda$) is described in WO2016102857. W($\lambda$) is also described in WO2012076714.

The colorimetric coefficients C* and h of the optical article of the invention in the international colorimetric CIE L*a*b* are calculated between 380 and 780 nm, taking the standard illuminant D65 and the observer into account (angle of incidence: 15°). The observer is a "standard observer" (10°) as defined in the international colorimetric system CIE L*a*b*.

Robustness σh is defined in WO 2015/000534.

A robustness is considered as satisfying if lower than 8, preferably lower than 7.5 for a hue corresponding to green.

dH*(angular sensitivity) (chromatic hue difference between incident angle 45° and incident angle 0°) is defined in CIE Lab 1976.

Good values of dH* are lower than or equal to 15 or preferably lower than or equal to 10.

It is possible to prepare interferential coatings without limitation as regards their hue angle (h), which relates to the residual color displayed by said interferential coating, and preferably ranges from 40° to 300°, more preferably from 50° to 290°. In some embodiments, the optical article has a hue angle (h) ranging from 240° to 300°, preferably from 250° to 290°, more preferably from 260° to 280°, thus resulting in a perceived residual reflected color blue to violet, preferably close to violet. In another embodiment, the optical article has a hue angle (h) higher than or equal to 135°, more preferably higher than or equal to 140° and better ranging from 140° to 160°, thus resulting in an interferential coating having a green reflection. In another embodiment, the optical article has a hue angle (h) ranging from 40° to 90°, preferably 50° to 90°, better 50° to 70°, thus resulting in an interferential coating having a gold reflection.

In some aspects of the invention, the interferential coating has a chroma (C*) that is lower than 15 (for an angle of incidence of 15°), more preferably lower than 10. Obtaining low residual color intensity (chroma) articles is preferable with respect to wearer's comfort viewpoint, in the cases of lenses.

The colorimetric coefficients of the lenses of the invention have a good robustness. The robustness is defined in WO201500534.

The invention further relates to a method of manufacturing an optical article such as described hereabove, comprising:
  providing an optical article comprising a substrate having at least one main face,
  depositing onto a main surface of the substrate a sub-layer having an exposed surface and a thickness higher than or equal to 100 nm,
  depositing onto said exposed surface of the sub-layer, a multilayer interferential coating comprising at least one high refractive index layer having a refractive index higher than 1.55 and at least one low refractive index layer having a refractive index of 1.55 or less, in which the outermost high refractive index layer(s) of the interferential coating do(es) not comprise $TiO_2$, the outermost low refractive index layer(s) of the interferential coating is (are) deposited without ionic assistance, and the ratio $R_D$ is higher than or equal to 2.

In preferred embodiments, the exposed surface of the sub-layer has been submitted to an ionic bombardment treatment prior to depositing said multilayer interferential coating, and/or the deposition of the sub-layer is conducted in a vacuum chamber in which at least one supplementary gas is supplied during said deposition.

In one embodiment, the present optical article is prepared by forming on the substrate a primer coating and/or an abrasion- and/or scratch-resistant coating in a first manufacturing site, while the other coatings are formed in a second manufacturing site.

The following examples illustrate the present invention in a more detailed, but non-limiting manner. Unless stated otherwise, all thicknesses disclosed in the present application relate to physical thicknesses. The percentages given in the tables are weight percentages. Unless otherwise specified, the refractive indexes referred to in the present invention are expressed at 20-25° C. for a wavelength of 550 nm.

EXAMPLES

1. General Procedures

The articles employed in the examples comprise a 65 mm-diameter ORMA® lens substrate (polymer obtained by polymerization of diethylene glycol bis (allyl carbonate) from Essilor based on CR-39® monomer, refractive index=1.5), a polycarbonate lens substrate, or a polythiourethane MR8® lens substrate (from Mitsui Toatsu Chemicals Inc., refractive index=1.59) with a power of −2.00 diopters and a thickness of 1.2 mm, coated on its concave face with the impact resistant primer coating and the abrasion- and scratch-resistant coating (hard coat, refractive index=1.6 except for examples 7-9: refractive index=1.5; the latter hard coat is disclosed in example 3 of EP 0614957), with an anti-reflection coating having a specific $R_D$ ratio, and with the antifouling coating disclosed in the experimental section of patent application WO 2010/109154, i.e., by evaporation under vacuum of the Optool DSX® compound marketed by Daikin Industries (thickness: from 2 to 5 nm).

The various layers such as the sub-layers, optical impedance layers and the layers of the anti-reflection coating were deposited without heating the substrates, by vacuum evaporation, optionally assisted (IAD) during the deposition by a beam of oxygen and possibly argon ions, when specified (evaporation source: electron gun), and optionally under pressure regulation by supplying (passive) $O_2$ gas into the chamber, where indicated.

The treating machine was a 1200 DLF from Satis, or a BAK2-F machine from Balzers equipped with an electron gun for the evaporation of the precursor materials, a thermal evaporator, a KRI EH 1000 F ion gun (from Kaufman & Robinson Inc.) for use in the preliminary phase of preparation of the surface of the substrate by argon ion bombardment (IPC) and in the ion-assisted deposition (IAD) of the layers.

2. Preparation of the Optical Articles

The lenses were placed on a carrousel provided with circular openings intended to accommodate the lenses to be treated, the concave side facing the evaporation sources and the ion gun.

The method for producing optical articles comprises introducing the lens substrate provided with an abrasion-resistant coating into a vacuum deposition chamber, conducting a pumping step until a high vacuum was created, followed by an ion gun conditioning step (IGC, such as disclosed in FR 2957454, $3.5 \times 10^{-5}$ mBar as starting pressure, 140 V, 3.5 A, argon, 60 seconds), a substrate surface activation step using a bombardment with an argon ion beam (IPC) with a starting pressure of $5.10^{-4}$ mBar (the ion gun was set to 3 A, 150 V, 60 seconds), stopping the ionic irradiation, and then successively evaporating the required number of layers (optional intermediate optical impedance layers, sub-layer, anti-reflection coating layers and antifouling coating) at a rate ranging from 0.4 to 3 nm/s, and lastly a ventilation step.

Forming the anti-reflection stack comprises a deposition step of a thin $SiO_2$ optical (impedance) layer at a rate of 1 nm/s under an $O_2$ pressure of $8.10^{-5}$ mBar (except for examples 7-9 where this layer was omitted), a deposition step of a thin $ZrO_2$ optical (impedance) layer at a rate of 1 nm/s under an $O_2$ pressure of $6.10^{-5}$ mBar (except for examples 7-9 where this layer was omitted), a surface activation step using an argon ion beam for 30 seconds (same treatment as IPC already conducted directly on the substrate), a deposition step of a $SiO_2$ sub-layer at a rate of 3 nm/s under an $O_2$ atmosphere at a pressure of $1.3 \times 10^{-4}$ mBar, a surface activation step of the sub-layer using an argon ion beam for 30 seconds (same treatment as IPC already conducted directly on the substrate), stopping the ionic irradiation, a deposition step of a HI layer ($ZrO_2$) at a rate of 2 nm/s under an $O_2$ pressure of $6.10^{-5}$ mBar, a deposition step of a LI layer ($SiO_2$) at a rate of 2 nm/s, a deposition step of a HI layer ($ZrO_2$) at a rate of 2 nm/s under an $O_2$ pressure of $6.10^{-5}$ mBar (except for example 3, where another HI layer, made of $Ta_2O_5$, was deposited at 3.5 nm/s with an oxygen ion assistance, ion gun: 2 A, 140 V, no $O_2$ pressure), a deposition step of an $SnO_2$ layer (HI, electrically conductive) at a rate of 1 nm/s with an oxygen ion assistance (ion gun: 2 A, 100 V), a deposition step of a LI layer ($SiO_2$) at a rate of 3 nm/s, and lastly a deposition step of an Optool DSX® layer at a rate of 0.4 nm/s.

In comparative example 2, the following stack was formed in this order, starting from the sub-layer, under the same conditions, unless otherwise indicated: $ZrO_2$ (2 nm/s, $O_2$ pressure of $7.10^{-5}$ mBar), $SnO_2$ (1 nm/s, oxygen ion assistance: 1.5 A, 100 V), $SiO_2$ (2 nm/s), $TiO_2$ (2 nm/s, oxygen ion assistance: 1.8 A, 100 V, $2.5\times10^{-5}$ mBar, no $O_2$ pressure), $SiO_2$ (3 nm/s).

3. Testing Methods

The following test procedures were used to evaluate the optical articles prepared according to the present invention. Several samples for each system were prepared for measurements and the reported data were calculated with the average of 40-100 data points.

Colorimetric measurements (in reflection) of the face coated with the stack of the invention: reflection factor Rv, hue angle h* and chroma C* in the international colorimetric CIE (L*, a*, b*) space were carried out with a Zeiss spectrophotometer, taking into account the standard illuminant D65, and the standard observer 10° (for h* and C*). They are provided for an angle of incidence of 15°.

The critical temperature of the article was measured in the manner indicated in patent application WO 2008/001011. It was measured one week after production of the article.

The thickness of the layers was controlled by means of a quartz microbalance.

The haze value H of both the reference and the tested optical article were measured by light transmission as disclosed in WO 2012/173596 utilizing the Haze-Guard Plus haze meter from BYK-Gardner (a color difference meter) according to the method of ASTM D1003-00 before and after the test has been performed. As haze is a measurement of the percentage of transmitted light scattered more than 2.5° from the axis of the incident light, the smaller the haze value, the lower the degree of cloudiness. Generally, for optical articles described herein, a haze value of less than or equal to 0.3% is acceptable, more preferably of less than or equal to 0.2%.

Determination of the Abrasion Resistance ("ISTM Bayer Test" or "Bayer Alumina")

"Bayer alumina" abrasion resistance was determined as disclosed in WO 2012/173596.

Specifically, abrasion resistance was measured by means of the alumina Bayer test, in accordance with the ASTM F735-81 standard (Standard Test Method for Abrasion Resistance of Transparent Plastics and Coatings Using Oscillating Sand Method), except that the sand was replaced by alumina.

As per this test, a coated lens and an uncoated lens (reference lens of similar curvature, diameter, thickness and diopter) were subjected to abrasion in an oscillating abrasive box using aluminum oxide ZF 152412 supplied by Specialty Ceramic Grains (approximately 1000 g) for 300 cycles of abrasion in 2 minutes (forward and back motions). The test was performed 24 h after preparation of the lenses. The reference lens is an ORMA® lens (ORMA® lens is obtained by polymerization of diethylene glycol bis(allyl carbonate). CR39® monomer from PPG can be used.

An amount or degree of abrasion was measured and performance results (Bayer value), were expressed as a calculated ratio of a reference lens to the coated lens, in which the degree of abrasion is a change in haze as measured by a lens hazemeter (Bayer value=$H_{standard}/H_{sample}$). A higher Bayer value indicates a higher abrasion resistance.

4. Results

The structural characteristics and the optical, mechanical and thermo-mechanical performances of the ophthalmic lenses obtained in the examples are detailed hereunder. The sub-layer is bolded and italicized.

| Example 1 | |
|---|---|
| Substrate + hard coat | |
| $SiO_2$ | 5.5 nm |
| $ZrO_2$ | 9 nm |
| $SiO_2$ | 158.5 nm |
| $ZrO_2$ | 13 nm |
| $SiO_2$ | 48 nm |
| $ZrO_2$ | 33.5 nm |
| $SnO_2$ | 6.5 nm |
| $SiO_2$ | 96.5 nm |
| Top coat | |
| $R_D$ | 2.41 |
| Bayer ISTM | 20.1 |
| Tc | 115° C. |
| C* | 9.84 |
| h | 152 |
| σh | 5.44 |
| dH* | 36.3 |
| Rv | 0.82% |
| Total thickness | 371 nm |

| Example 2 | |
|---|---|
| Substrate + hard coat | |
| $SiO_2$ | 40.5 nm |
| $ZrO_2$ | 8.5 nm |
| $SiO_2$ | 130 nm |
| $ZrO_2$ | 24 nm |
| $SiO_2$ | 43.5 nm |
| $ZrO_2$ | 42 nm |
| $SnO_2$ | 6.5 nm |
| $SiO_2$ | 100.5 nm |
| Top coat | |
| $R_D$ | 2.07 |
| Bayer ISTM | 18.4 |
| Tc | 115° C. |
| C* | 9.5 |
| h | 151 |
| σh | 6.9 |
| dH* | 7.95 |
| Rv | 0.78% |
| Total thickness | 395 nm |

| Example 3 | |
|---|---|
| Substrate + hard coat | |
| $SiO_2$ | 39 nm |
| $ZrO_2$ | 7 nm |
| $SiO_2$ | 135 nm |
| $ZrO_2$ | 28 nm |

-continued

| | |
|---|---|
| SiO$_2$ | 43.5 nm |
| Ta$_2$O$_5$ | 31.5 nm |
| SnO$_2$ | 6.5 nm |
| SiO$_2$ | 100.5 nm |
| Top coat | |
| R$_D$ | 2.64 |
| Bayer ISTM | 17 |
| Tc | 100° C. |
| C* | 9.43 |
| h | 150 |
| σh | 4.64 |
| dH* | 5.44 |
| Rv | 0.8% |
| Total thickness | 391 nm |

Example 4

| Substrate + hard coat | |
|---|---|
| SiO$_2$ | 30.5 nm |
| ZrO$_2$ | 4.5 nm |
| SiO$_2$ | 170 nm |
| ZrO$_2$ | 24 nm |
| SiO$_2$ | 31.5 nm |
| ZrO$_2$ | 37.5 nm |
| SnO$_2$ | 6.5 nm |
| SiO$_2$ | 105.5 nm |
| Top coat | |
| R$_D$ | 2.51 |
| Bayer ISTM | 18 |
| Tc | 105° C. |
| C* | 13.74 |
| h | 248 |
| σh | 6.79 |
| dH* | 7.68 |
| Rv | 0.81% |
| Total thickness | 410 nm |

Example 5

| Substrate + hard coat | |
|---|---|
| SiO$_2$ | 41.5 nm |
| ZrO$_2$ | 5 nm |
| SiO$_2$ | 170 nm |
| ZrO$_2$ | 20 nm |
| SiO$_2$ | 30.5 nm |
| ZrO$_2$ | 38.5 nm |
| SnO$_2$ | 6.5 nm |
| SiO$_2$ | 103 nm |
| Top coat | |
| R$_D$ | 2.29 |
| Bayer ISTM | |
| Tc | |
| C* | 19.65 |
| h | 270 |
| σh | 7.02 |
| dH* | 18.14 |
| Rv | 0.5% |
| Total thickness | 415 nm |

Example 6

| Substrate + hard coat | |
|---|---|
| SiO$_2$ | 30.5 nm |
| ZrO$_2$ | 8.5 nm |
| SiO$_2$ | 170 nm |
| ZrO$_2$ | 14 nm |
| SiO$_2$ | 42 nm |
| ZrO$_2$ | 35 nm |
| SnO$_2$ | 6.5 nm |
| SiO$_2$ | 90.5 nm |

-continued

| Top coat | |
|---|---|
| R$_D$ | 2.18 |
| Bayer ISTM | |
| Tc | |
| C* | 9.51 |
| h | 60 |
| σh | 8.52 |
| dH* | 4.99 |
| Rv | 0.8% |
| Total thickness | 397 nm |

Example 7

| Substrate + hard coat | |
|---|---|
| SiO$_2$ | 130 nm |
| ZrO$_2$ | 26 nm |
| SiO$_2$ | 39 nm |
| ZrO$_2$ | 42 nm |
| SnO$_2$ | 6.5 nm |
| SiO$_2$ | 100 nm |
| Top coat | |
| R$_D$ | 2.06 |
| Bayer ISTM | |
| Tc | |
| C* | 10.5 |
| h | 147 |
| σh | 7.31 |
| dH* | 6.60 |
| Rv | 0.79% |
| Total thickness | 343 nm |

Example 8

| Substrate + hard coat | |
|---|---|
| SiO$_2$ | 170 nm |
| ZrO$_2$ | 21 nm |
| SiO$_2$ | 37 nm |
| ZrO$_2$ | 33.5 nm |
| SnO$_2$ | 6.5 nm |
| SiO$_2$ | 108.5 nm |
| Top coat | |
| R$_D$ | 2.71 |
| Bayer ISTM | |
| Tc | |
| C* | 13.96 |
| h | 240 |
| σh | 7.40 |
| dH* | 14.51 |
| Rv | 0.82% |
| Total thickness | 376 nm |

Example 9

| Substrate + hard coat | |
|---|---|
| SiO$_2$ | 183 nm |
| ZrO$_2$ | 19.5 nm |
| SiO$_2$ | 35 nm |
| ZrO$_2$ | 40 nm |
| SnO$_2$ | 6.5 nm |
| SiO$_2$ | 105.5 nm |
| Top coat | |
| R$_D$ | 2.27 |
| Bayer ISTM | |
| Tc | |
| C* | 17.27 |
| h | 270 |
| σh | 5.47 |
| dH* | 13.97 |
| Rv | 0.5% |

-continued

| | |
|---|---|
| Total thickness | 390 nm |

Comparative example 1

Substrate + hard coat

| | |
|---|---|
| $SiO_2$ | 29 nm |
| $ZrO_2$ | 5.5 nm |
| SiO2 | 143.5 nm |
| $ZrO_2$ | 19.5 nm |
| $SiO_2$ | 20.5 nm |
| $ZrO_2$ | 87.5 nm |
| $SnO_2$ | 6.5 nm |
| $SiO_2$ | 78.5 nm |

Top coat

| | |
|---|---|
| $R_D$ | 0.84 |
| Bayer ISTM | 14.5 |
| Tc | 100° C. |
| C* | 9.0 |
| h | 135 |
| σh | 5.10 |
| dH* | 5.94 |
| Rv | 0.69% |
| Total thickness | 390 nm |

Example 10

Substrate + hard coat

| | |
|---|---|
| $SiO_2$ | 6 nm |
| $ZrO_2$ | 6 nm |
| $SiO_2$ | 161.5 nm |
| $ZrO_2$ | 12 nm |
| $SiO_2$ | 46.5 nm |
| $ZrO_2$ | 29 nm |
| $SnO_2$ | 6.5 nm |
| $SiO_2$ | 98 nm |

Top coat

| | |
|---|---|
| $R_D$ | 2.76 |
| Bayer ISTM | 19.4 |
| Tc | 115° C. |
| C* | 8.5 |
| h | 135 |
| σh | 10.26 |
| dH* | 21.37 |
| Rv | 0.77% |
| Total thickness | 366 nm |

Comparative example 2

Substrate + hard coat

| | |
|---|---|
| $SiO_2$ | 32.5 nm |
| $ZrO_2$ | 7 nm |
| $SiO_2$ | 157.5 nm |
| $ZrO_2$ | 19.5 nm |
| $SnO_2$ | 6.5 nm |
| $SiO_2$ | 18 nm |
| $TiO_2$ | 19.5 nm |
| $SiO_2$ | 110.5 nm |

Top coat

| | |
|---|---|
| $R_D$ | 5.67 |
| Bayer ISTM | 14.9 |
| Tc | 87° C. |
| C* | 9.56 |
| h | 150 |
| σh | 2.7 |
| dH* | 5.90 |
| Rv | 0.79% |
| Total thickness | 401 nm |

In all examples except comparative example 2, there are two adjacent high refractive index layers in outermost position in the interferential coating. This means that the thicknesses of these two adjacent layers are taken into account for the calculation of the denominator of the $R_D$ ratio.

Optical articles according to the invention, having a high $R_D$ ratio and a sub-layer, exhibit better abrasion resistance and critical temperature than comparative articles with a low $R_D$ ratio (compare examples 1, 2, 3, 4, with comparative example 1), for a comparable level of anti-reflection performance (Rv ranging from 0.5 to 0.8%). As an external high refractive index material, $ZrO_2$ (example 2) provides slightly better mechanical performances than $Ta_2O_5$ (example 3), and much better mechanical performances than $TiO_2$ (comparative example 2).

It is worth noting that the concept of the present invention of having a high $R_D$ ratio is different from the concept disclosed in the patent U.S. Pat. No. 7,692,855 of having a high $R_T$ ratio, the latter ratio taking generally into account the thickness of each layer of the anti-reflection coating. Indeed, several examples according to the invention do not present a $R_T$ ratio as defined in U.S. Pat. No. 7,692,855 that is higher than 2.1 (respective $R_T$ ratios of examples 2, 3, 4 and 7 are 1.98, 2.01, 2.04 and 1.87).

It has been possible to obtain optical articles having a high $R_D$ ratio with a green reflected light (examples 1, 2, 3, 7), a yellow reflected light (example 6), a blue reflected light (examples 4, 8), or a violet reflected light (example 5).

The invention claimed is:

1. An optical article comprising a substrate having at least one main face successively coated with:
   a monolayer sub-layer having a thickness higher than or equal to 100 nm; and
   a multilayer interferential coating comprising a stack of at least one high refractive index layer having a refractive index higher than 1.55 and at least one low refractive index layer having a refractive index of 1.55 or less;
wherein the ratio:

$$R_D = \frac{\text{thickness of the outermost low refractive index layer(s) of the interferential coating}}{\text{thickness of the outermost high refractive index layer(s) of the interferential coating}}$$

is higher than or equal to 2, the outermost high refractive index layer(s) of the interferential coating do(es) not comprise $TiO_2$, and the outermost low refractive index layer(s) of the interferential coating is (are) deposited without ionic assistance; and wherein the high refractive index layers of the interferential coating have a refractive index lower than or equal to 2.2.

2. The optical article of claim 1, wherein the ratio $R_D$ is higher than or equal to 2.25.

3. The optical article of claim 2, wherein the ratio $R_D$ is higher than or equal to 2.5.

4. The optical article of claim 1, wherein the sub-layer has a thickness higher than or equal to 120 nm.

5. The optical article of claim 1, wherein the sub-layer is a $SiO_2$-based layer.

6. The optical article of claim 1, wherein the sub-layer is in direct contact with the interferential coating.

7. The optical article of claim 1, wherein the deposition of the sub-layer is conducted in a vacuum chamber in which at least one supplementary gas is supplied during said deposition.

8. The optical article of claim 1, wherein the residual color displayed by said interferential coating has a hue angle h ranging from 40° to 300°.

9. The optical article of claim 1, wherein the high refractive index layers of the interferential coating comprise at least one material selected from $Ta_2O_5$, $Nb_2O_5$, $PrTiO_3$, $ZrO_2$ and $Y_2O_3$.

10. The optical article of claim 1, wherein the interferential coating does not comprise any layer comprising titanium oxide.

11. The optical article of claim 1, wherein the interferential coating comprises at least one electrically conductive layer.

12. The optical article of claim 1, wherein the interferential coating is an anti-reflection coating.

13. The optical article of claim 1, wherein the sub-layer has a thickness lower than or equal to 355 nm.

14. The optical article of claim 1, wherein the total thickness of the interferential coating plus the thickness of the sub-layer is lower than or equal to 500 nm.

15. The optical article of claim 1, wherein the optical article is an ophthalmic lens.

16. A method of manufacturing the optical article of claim 1, comprising:
providing an optical article comprising a substrate having at least one main face;
depositing onto a main surface of the substrate a sub-layer having an exposed surface and a thickness higher than or equal to 100 nm; and
depositing onto said exposed surface of the sub-layer a multilayer interferential coating comprising at least one high refractive index layer having a refractive index higher than 1.55 and at least one low refractive index layer having a refractive index of 1.55 or less, in which the outermost high refractive index layer(s) of the interferential coating do(es) not comprise $TiO_2$, the outermost low refractive index layer(s) of the interferential coating is (are) deposited without ionic assistance;
wherein the ratio:

$$R_D = \frac{\text{thickness of the outermost low refractive index layer(s) of the interferential coating}}{\text{thickness of the outermost high refractive index layer(s) of the interferential coating}}$$

is higher than or equal to 2; and
wherein the high refractive index layers of the interferential coating have a refractive index lower than or equal to 2.2.

17. The method of claim 16, wherein the exposed surface of the sub-layer has been submitted to an ionic bombardment treatment prior to depositing said multilayer interferential coating, and wherein the deposition of the sub-layer is conducted in a vacuum chamber in which at least one supplementary gas is supplied during said deposition.

18. An optical article comprising a substrate having at least one main face successively coated with:
a monolayer sub-layer having a thickness higher than or equal to 100 nm; and
a multilayer interferential coating comprising a stack of at least one high refractive index layer having a refractive index higher than 1.55 and at least one low refractive index layer having a refractive index of 1.55 or less;
wherein the ratio:

$$R_D = \frac{\text{thickness of the outermost low refractive index layer(s) of the interferential coating}}{\text{thickness of the outermost high refractive index layer(s) of the interferential coating}}$$

is higher than or equal to 2, the outermost high refractive index layer(s) of the interferential coating do(es) not comprise $TiO_2$, and the outermost low refractive index layer(s) of the interferential coating is (are) deposited without ionic assistance; and
wherein the interferential coating is applied on the front main face of the optical article, and the average reflectance on the front main face, between 350 nm and a wavelength comprised between 380 nm and 400 nm, weighted by the function $W(\lambda)$, is lower than 35%, for at least one angle of incidence comprised between 0° and 17°.

19. An optical article comprising a substrate having at least one main face successively coated with:
a monolayer sub-layer having a thickness higher than or equal to 100 nm; and
a multilayer interferential coating comprising a stack of at least one high refractive index layer having a refractive index higher than 1.55 and at least one low refractive index layer having a refractive index of 1.55 or less;
wherein the ratio:

$$R_D = \frac{\text{thickness of the outermost low refractive index layer(s) of the interferential coating}}{\text{thickness of the outermost high refractive index layer(s) of the interferential coating}}$$

is higher than or equal to 2, the outermost high refractive index layer(s) of the interferential coating do(es) not comprise $TiO_2$, and the outermost low refractive index layer(s) of the interferential coating is (are) deposited without ionic assistance; and
wherein the reflection on said main face is lower than 50% for at least one wavelength in the wavelength range 300-350 nm, at an angle of incidence of 15°.

* * * * *